United States Patent
Efremov et al.

(10) Patent No.: US 11,556,670 B2
(45) Date of Patent: Jan. 17, 2023

(54) SYSTEM AND METHOD OF GRANTING ACCESS TO DATA OF A USER

(71) Applicant: AO Kaspersky Lab, Moscow (RU)

(72) Inventors: Andrey A. Efremov, Moscow (RU); Dmitry V. Shmoylov, Moscow (RU); Pavel V. Filonov, Moscow (RU); Dmitry G. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 50 days.

(21) Appl. No.: 17/203,856

(22) Filed: Mar. 17, 2021

(65) Prior Publication Data

US 2022/0092218 A1 Mar. 24, 2022

(30) Foreign Application Priority Data

Sep. 24, 2020 (RU) .......................... RU2020131454

(51) Int. Cl.
*G06F 21/62* (2013.01)
(52) U.S. Cl.
CPC ............................. *G06F 21/6254* (2013.01)
(58) Field of Classification Search
CPC ................................................. G06F 21/6254
See application file for complete search history.

(56) References Cited

U.S. PATENT DOCUMENTS

| | | | |
|---|---|---|---|
| 7,065,525 B1 * | 6/2006 | Sasaki | G06F 16/955 369/13.01 |
| 9,124,637 B2 | 9/2015 | Brouwer et al. | |
| 9,609,025 B1 * | 3/2017 | Betzler | H04L 63/0245 |
| 9,838,830 B2 | 12/2017 | Lyons | |
| 11,366,786 B2 * | 6/2022 | Barday | G06F 21/577 |
| 11,403,684 B2 * | 8/2022 | Gupta | H04W 4/14 |
| 2009/0198805 A1 * | 8/2009 | Ben-Shaul | G06F 9/4416 709/222 |
| 2012/0036370 A1 | 2/2012 | Lim et al. | |
| 2015/0373149 A1 | 12/2015 | Lyons | |
| 2016/0134932 A1 | 5/2016 | Karp et al. | |
| 2019/0354709 A1 | 11/2019 | Brinskelle | |
| 2020/0034563 A1 * | 1/2020 | Stockert | G16H 10/60 |
| 2020/0244667 A1 * | 7/2020 | Panarello | G06F 21/604 |
| 2020/0356697 A1 * | 11/2020 | Brannon | G06Q 20/209 |
| 2021/0328982 A1 * | 10/2021 | Praszczalek | H04L 9/12 |
| 2022/0070019 A1 * | 3/2022 | Hebeisen | H04L 12/10 |
| 2022/0075896 A1 * | 3/2022 | Barday | G06F 15/76 |
| 2022/0083622 A1 * | 3/2022 | Brannon | G06F 16/9574 |
| 2022/0094531 A1 * | 3/2022 | Kozlov | H04L 9/0894 |

(Continued)

*Primary Examiner* — Joseph P Hirl
*Assistant Examiner* — Stephen T Gundry
(74) *Attorney, Agent, or Firm* — ArentFox Schiff LLP; Michael Fainberg

(57) ABSTRACT

Disclosed herein are systems and methods for granting access to data of a user. In one aspect, an exemplary method comprises, blocking the processing of data of a user, transferring the data of the user to a storage device, receiving a request for data processing from a collected data processor of a device, redirecting the received request to the storage device, determining, by the storage device, data access rights for the collected data processor of the device from which the request for data processing is received in accordance with data access rights established by a data access rights manager, and providing access to the data in accordance with the determined data access rights.

21 Claims, 9 Drawing Sheets

(56) References Cited

U.S. PATENT DOCUMENTS

| | | | |
|---|---|---|---|
| 2022/0100898 A1* | 3/2022 | Barday | G06F 21/6245 |
| 2022/0108026 A1* | 4/2022 | Ortiz | G06F 21/602 |
| 2022/0121731 A1* | 4/2022 | Groth | G06Q 50/18 |
| 2022/0121777 A1* | 4/2022 | Brannon | G06F 21/6245 |
| 2022/0188925 A1* | 6/2022 | Blaikie, III | H04L 9/50 |
| 2022/0222373 A1* | 7/2022 | Villax | G06F 21/6254 |
| 2022/0237325 A1* | 7/2022 | Barday | G06Q 10/1053 |
| 2022/0255763 A1* | 8/2022 | Campbell | H04L 9/50 |

* cited by examiner

SYSTEM AND METHOD OF GRANTING ACCESS TO DATA OF A USER

CROSS REFERENCE TO RELATED APPLICATIONS

The present application claims priority to Russian Patent Application No. 2020131454, filed on Sep. 24, 2020, the entire content of which is incorporated herein by reference.

FIELD OF TECHNOLOGY

The present disclosure relates to the field of data anonymization, protection of the confidentiality of data of a user, and ensuring privacy of the user.

BACKGROUND

At present, the volume of data to be collected from users' devices continues to grow. At the same time, there is growth in the variety and number of the devices from which data is collected. The devices from which data is collected include Internet of Things (IoT) devices, personal computers, notebooks, and smartphones. The data is commonly collected from devices without any clear consent by the user. However, even if such consent is given, the user does not always understand all the consequences of his/her decision. Data collected from devices is subsequently distributed around the network in an uncontrolled way, and may cause harm to the user. For example, a user may become a victim of criminals who have obtained his/her telephone or credit card number. Moreover, malicious parties are not always the only ones that cause problems. For instance, unscrupulous employers may use data from users' devices to track their employees. Another result of uncontrolled data collection is the annoying targeting of advertisements for special categories of merchandise.

Device manufacturers attempt to defend the user from concealed data collection and to regulate data operations. One example is Google's Firebase system, which synchronizes data between different applications on Android devices and grants access to these data to a third party.

In products manufactured by Apple corporation, there is a similar platform that attempts to defend the user. The platform on Apple products is called the Apple Security Framework and its primary goal is to protect information, establish a trusted connection, and control access to software on a device. For example, the Apple Security Framework is used to establish a user's identity, ensure the security of data both in a storage and during transmission over a network, and confirm the validity of code.

However, the above device manufacturer attempts have shortcomings. The mechanisms to allow data from devices to be shared with third parties are not transparent for the user, are irreversible, and only provide weak protection against tracking by third-party applications.

Therefore, there is a need for a more optimal and effective way of granting access to data of a user while ensuring privacy.

SUMMARY

Aspects of the disclosure relate to granting access to data of a user while ensuring privacy. The data is exchanged between a user's data storage and computing devices of parties interested in the data.

In one exemplary aspect, a method is provided for granting access to data of a user, the method comprising: blocking the processing of data of a user, transferring the data of the user to a storage device, receiving a request for data processing from a collected data processor of a device, redirecting the received request to the storage device, determining, by the storage device, data access rights for the collected data processor of the device from which the request for data processing is received in accordance with data access rights established by a data access rights manager, and providing access to the data in accordance with the determined data access rights.

In one aspect, the method further comprises detecting an absence of the requested data, and transferring information about the absent data to the storage device.

In one aspect, the transferring of the data of the user to the storage device is performed through at least one of a route modifier and an anonymizer, wherein the rout modifier analyzes the data in fields of data structure received from a data collector, divide the data structure into substructures in order to determine the state of the data, and select the route for sending data to the storage device for the resulting substructure, and wherein the anonymizer anonymizes user identifiers.

In one aspect, the request is processed without redirecting to the storage device when the collected data processor is on the list of trusted devices or when the request is related to a basic functionality accepted by a user device.

In one aspect, the blocking of the processing includes blocking at least one of: mobile and web tracking; collecting geolocation information; collecting search queries; and collecting registration data.

In one aspect, the blocking of the processing of the data blocks the processing by the collected data processor of an external device.

In one aspect, the request for data processing is received from the collected data processor implicitly by a blocker or directly by a data access rights manager, and wherein when the request is received by the blocker, the request is forwarded to the data access rights manager.

According to one aspect of the disclosure, a system is provided for granting access to data of a user, the system comprising a hardware processor configured to: block the processing of data of a user, transfer the data of the user to a storage device, receive a request for data processing from a collected data processor of a device, redirect the received request to the storage device, determine, by the storage device, data access rights for the collected data processor of the device from which the request for data processing is received in accordance with data access rights established by a data access rights manager, and provide access to the data in accordance with the determined data access rights.

In one exemplary aspect, a non-transitory computer-readable medium is provided storing a set of instructions thereon for granting access to data of a user, wherein the set of instructions comprises instructions for: blocking the processing of data of a user, transferring the data of the user to a storage device, receiving a request for data processing from a collected data processor of a device, redirecting the received request to the storage device, determining, by the storage device, data access rights for the collected data processor of the device from which the request for data processing is received in accordance with data access rights established by a data access rights manager, and providing access to the data in accordance with the determined data access rights.

The method and system of the present disclosure are designed to provide data security, while allowing the user's data to be transmitted between the computing devices of the parties interested in the data and any number of devices of the user from which the data is being gathered and transmitted.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for granting access to data of a user in accordance with aspects of the present disclosure. For instance, the method of the present disclosure may be used for exchanging data between a device of a user and a device of an entity interested in the user's data. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
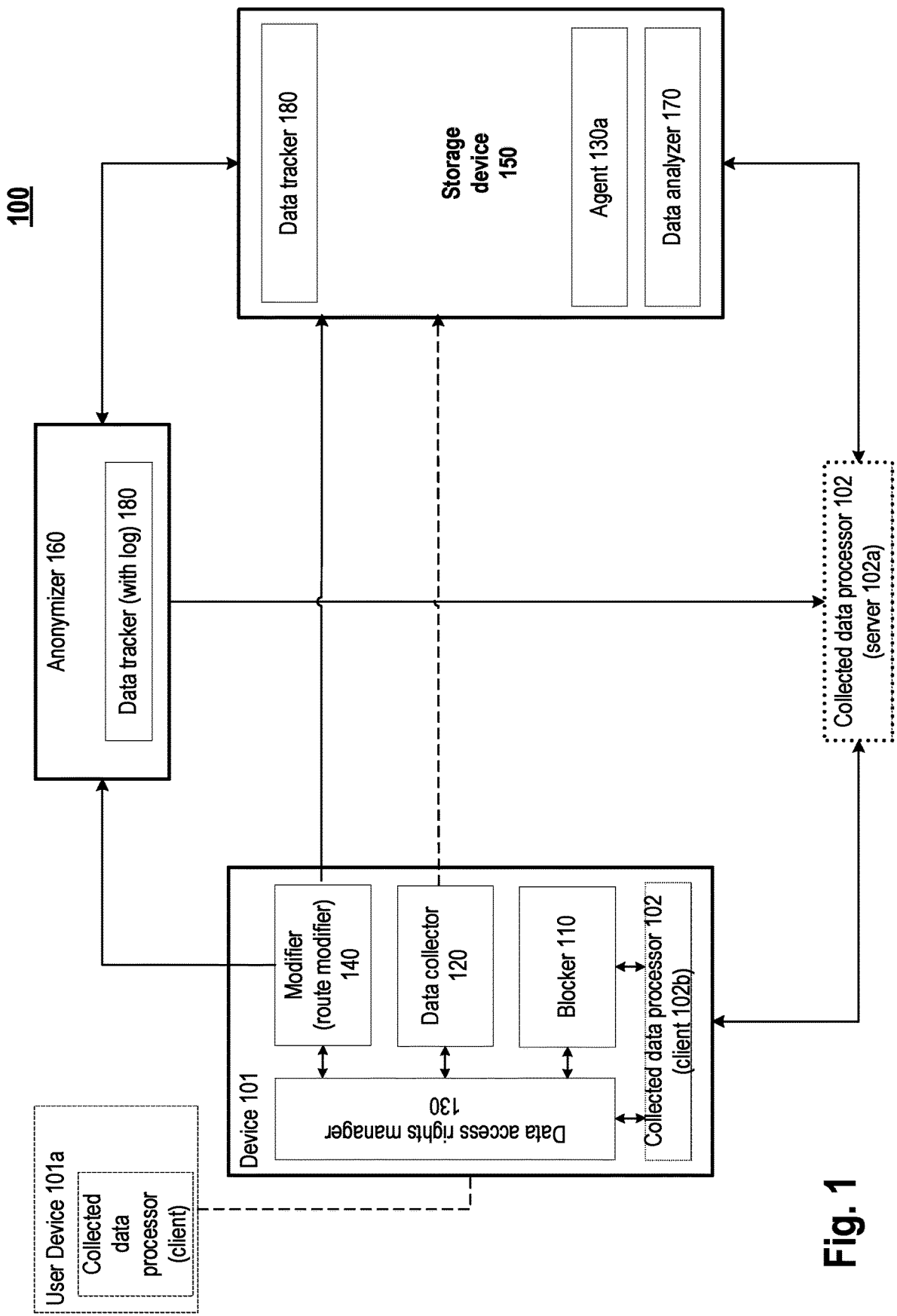
FIG. 1 illustrates a system for exchanging data received from devices of a user.

FIG. 1 illustrates a system 100 for exchanging data received from devices of a user. The system 100 is intended for a transparent and secure processing of the data of users of any number of devices 101. In the context of the present disclosure, "data of a user of a device" refers to data received from any number of devices in the user's environment. The data may be created on a device by various types of software, and includes both data input by the user and data created in the operation of programs and applications. For example, the data may be for a stream of clicks (also known as a "clickstream"), communications in messaging services, location data, data from smart home IoT devices, data from other IoT devices in the user's ecosystem, such as a private car, and the like.

In one aspect, the system 100 includes a blocker 110, a data collector 120, a data access rights manager 130, a modifier 140, a storage device 150, an anonymizer 160, data analyzer 170, and a data tracker 180.

Figure 5:
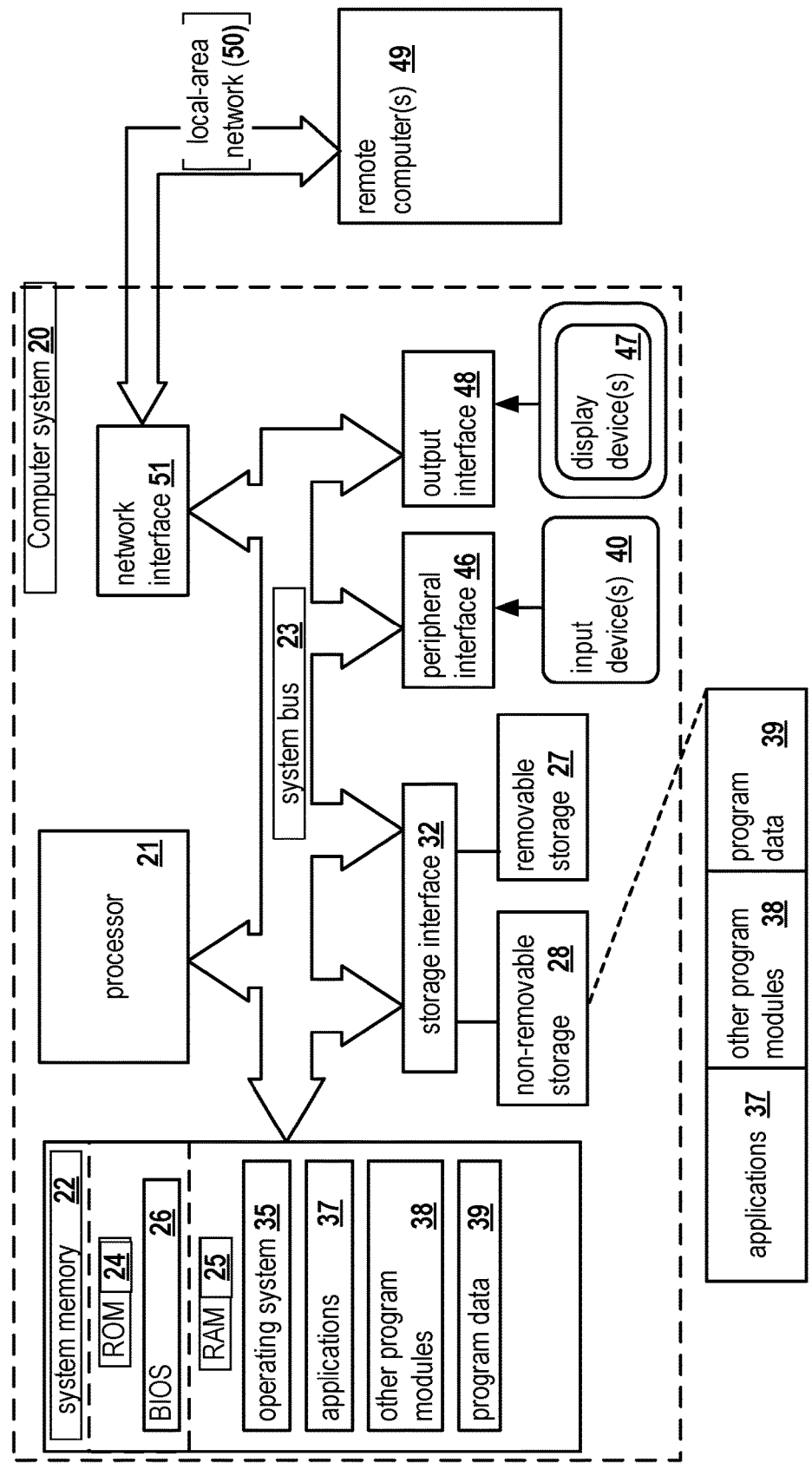
FIG. 5 presents an example of a general purpose computer system on which aspects of the present disclosure can be implemented.

In the present disclosure, the blocker 110, data collector 120, data access rights manager 130, modifier 140, storage device 150, anonymizer 160, data analyzer 170 and data tracker 180 are considered to denote real devices, systems, components and groups of components constructed with the use of hardware such as integrated microcircuits (in English, "application-specific integrated circuit", ASIC) or programmable gate arrays (in English, "field-programmable gate array", FPGA), or, for example, in the form of a combination of software and hardware such as a microprocessor system and a set of program instructions, and also on neuromorphic chips (in English, "neurosynaptic chips"). The functionality of the various modules or components of the system 100 may be implemented solely by hardware, or additionally in the form of a combination in which some of the functionality is implemented by software and some by hardware. In one aspect, the various functionalities may be implemented on the processor of a general-purpose computer (as shown in FIG. 5, for example). Databases may be implemented by any feasible methods and may be contained on a single physical medium or on various media located either locally or remotely.

The blocker 110 is intended to block the processing of data (including personal data) on the user's device by a collected data processor 102. Blocking can be carried out on any collected data processor 102, including third-party means and those belonging to the platform by which the device is controlled (for example, Apple, Google, Huawei and Xiaomi software) on which the blocker is installed, or which are accessible to the blocker. For example, the blocker 110 may be installed on a router through which the user's personal devices 101a communicate with the internet, IoT devices. Then, the blocker analyzes the network traffic flowing through the router on which the blocker 110 is installed. A particular case of a collected data processor may be a client 102b (for example, an application) that collects the user's data 101 on the device at the request of a server 102a connected to the application in the context of a client-server interaction. "Data processing" refers to any action (operation) or combination of actions (operations) carried out with the use of data automation means (e.g., computing devices), including the collection, recording, arrangement, accumulation, storage, adjustment (updating, changing), extraction, use, transmission (distribution, supply, access), depersonalization, blocking, removal and deletion of data.

In one aspect of the disclosure, the collection of critical data is blocked, rather than the collection of any data. Critical data include data in respect of which the law or an authorized party imposes restrictions on collection, storage, access, distribution and processing. Critical data is usually sensitive to disclosure, distribution, or leakage. Occurrences of disclosure, distribution and/or leakage typically results in an infringement of the rights and legally protected interests of parties. Moreover, the occurrences of these types of events may create a for parties who have permitted the infringement of the rules for collection, storage, access, processing specified for these data to occur. A particular case of critical data is that of confidential data ("sensitive data"). In the context of the present disclosure, confidential data and confidential information are synonymous. Confidential data includes data stored in accordance with the law of the country whose jurisdiction covers the user of the device (i.e., the client in the system described above).

In one aspect, confidential data include personal data (PD) and data containing:
  commercial secrets;
  tax secrets;
  banking secrets;
  medical secrets;
  notarial secrets;
  legal secrets;
  auditing secrets;
  communications secrets;
  insurance secrets;
  testamentary secrets;
  adoption secrets;
  confessional secrets;
  investigation secrets;
  judicial secrets;
  information about protected persons; and
  government secrets.

In one aspect, the processing of a user's data for marketing purposes is blocked.

In another aspect, the processing of any of a user's data by the collected data processor 102 is blocked where the data are not concerned with the direct functionality of applications or programs using these collected data processor 102. In another aspect, any processing by the collected data processor 102 not included on the list of permitted (trusted) devices or servers is blocked. The blocking of data processing may be carried out by various methods directly or indirectly. When the blocking of data processing is performed directly, the actions associated with the data processing are blocked. When the blocking of data processing is performed via an indirect blocking method, the data processing is not directly impeded, but the processing does not achieve its objectives even though it is executed. In one aspect, a direct blocking method includes prohibiting access to a user's data by the collected data processor 102. In one aspect, an indirect processing method includes a method for disabling links between data to be sent from a device of a user and the identifier of the user. For example, the method may remove cookie files or spoof the identifier of the user that is set up by tracking networks on the device of the user.

The data access rights manager 130 is intended to manage access to data. The data access rights manager 130 formulates the rights of the collected data processor 102 to access data, withdraws data access rights from collected data processor, and creates lists of permitted (trusted) collected data processors 102.

The data access rights manager 130 stores or establishes the structure format (data model) for the user's data specified for allocation on the storage device 150. In one aspect, the data access rights manager 130 may be customized by external updatable policies or by user policies or directly by the user's input. The data access rights manager 130 also updates the user's data model specified for sending to the storage device (operating scenarios will be described below). The data model may be using known techniques for data organization.

The data collector 120 is intended to collect data of a user which is specified as being data suitable for transmission to the storage device 150 from the user's devices. The data collector 120 receives fields of data structure from the access rights manager 130, and completes the received fields of the data structure. The data collector 120 then transfers the completed data structure to the modifier 140. In one aspect, the data collector 120 sends the completed data structure to the storage device 150 directly. Usually, the blocking by the blocker 110 and the collection of data by the data collector 120 take place independently of the data requirements of the collected data processor 102. For example, according to the settings, the blocker 110 blocks web tracking, and the data collector 120 collects all the data whose processing was blocked in advance (before the attempted processing by the means 102) on the device 101 by the blocker 110; the collected data are then stored in the storage device 150.

In one aspect, the device 101 comprises a modifier 140 which is intended to: analyze the data in the fields of the structure received from the data collector 120; in order to determine the state of the data, divide the data structure into substructures; and for the resulting substructures, select the route for sending data to the remote storage device. The modifier 140 determines the necessity of dividing the structure into substructures according to the fields of the structure. There may be various criteria for the division of the data structure into substructures, one of these criteria being the presence of personal data ("Personal Identification Information" (PII)) or special categories thereof (according to the terminology of General Data Protection Regulation (GDPR), for example). When personal data is present, the data structure is divided in such a way that one substructure contains personal data or special categories thereof, while the other substructure contains data that are not personal. The relationship of the data to personal data is determined, for example, by the law of the country whose jurisdiction covers the user of the device that constitutes the client in the system described (in other words, according to the location of the data source). Another, more general, criterion is the presence of critical data. In a particular case, the modifier 140 is intended to convert the data structures on the device before sending the data to the storage device 150. In one aspect, the methods for converting the data substructures include:
  quantization;
  sorting;
  merging (pasting);
  grouping;
  adjusting the data set;
  tabular data substitution;
  calculated values;
  data encoding;
  encryption;
  convolution; and
  normalization (scaling).

Some kinds of conversion may be used not only for individual data (fields) in a substructure, but also for a substructure as a whole, for example tokenization and/or encryption. In one aspect, the conversion is performed such that reversing the conversion is not possible without the use of the modifier 140 and/or the storage device 150. In this case, the term "conversion" refers to a transformation or mapping of a quantity to another quantity, e.g., using a function that operates on the first quantity to obtain a second quantity.

In one aspect, the modifier 140 selects a network route along which the structure or substructure will be sent to the storage device 150. This route may include an anonymizer 160. The anonymizer 160 is intended to convert the structures and substructures passing through it by both direct and reverse conversion (examples will be discussed below). The anonymizer is not located in a single local network or intranet (the network of a single organization, for example) with the device 101, and in a particular case with the storage device 150. The data tracker 180 is connected to the anonymizer and to the storage device 150.

The data tracker 180 is intended to track operations with the user's data and to record all acts of retrieval of the user's data from the storage device 150. The data tracked 180 maintains a log of retrieval of the user's data. Based on the content of the log, the data tracker 180 checks the legality of the use of the user's data by third parties. For example, the history of the user's search queries may be transmitted to a network N without the right of transmission to third parties, as recorded by the data tracker 180. Suppose subsequently, the user receives advertising offers from network M, wherein the advertising offers are based on the user's search queries, as recorded by an additional means of the system 100 (not shown in FIG. 1). Then, based on the data obtained from the user's device and the content of the data tracker 180, the system 100 records the incident. This incident may be processed subsequently according to supplementary devices (add-ons) of the system 100. For example, the supplementary devices of the system 100 may perform any of: creating a complaint to be sent to network N, sending a demand to network M demanding for a removal of the data, sending information to a regulator, etc.

The storage device 150 is intended for the location of data of a user. The storage device may transfer the user's data to the collected data processor 102 and also allow the data to be processed without direct transmission in the storage device 150. The storage device 150 is connected to a data analyzer 170. The data analyzer 170 is intended to be used for an automated data analysis, based on the data analysis, constructing various analytical accounts, aggregating results, and storing the aggregated results in the storage device 150. In one aspect the aggregated results may be transferred to an external collected data processor 102, if the latter has rights for accessing the aggregated results. The data analyzer 170 also links the data from various devices 101 of a single user/household. The storage device 150 is also connected to a data access rights manager 130 (through an agent 130a, for example), since the storage device determines the rights of access of the collected data processor to the user's data.

The storage device 150 may be located in the device 101, in the local network of the device 101, or remotely, as shown in FIG. 1. In a particular case, the storage device receives the user's data, including data from collected data processor. For example, it receives data from the collected data processor of social networks, online and offline retail stores, advertising networks, data exchanges, and others.

Figure 2:
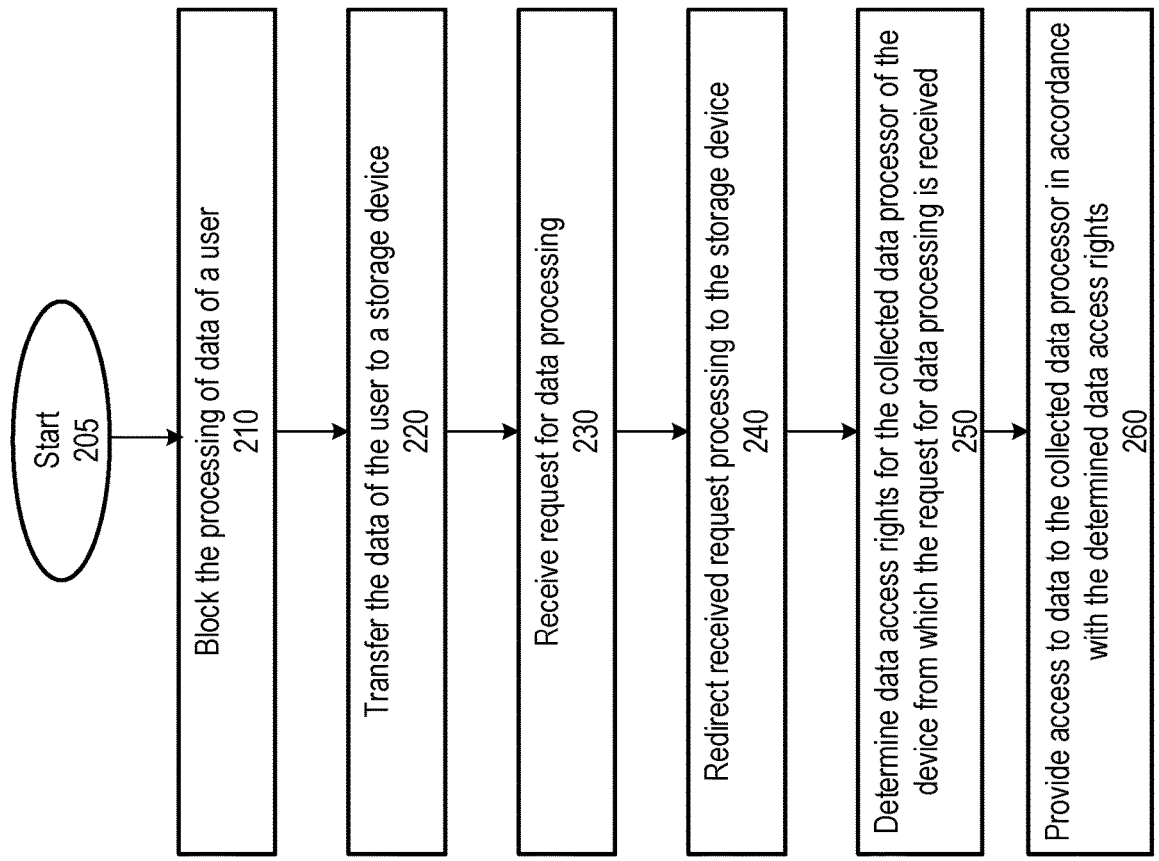
FIG. 2 illustrates an exemplary method for granting access to data of a user in accordance with aspects of the present disclosure, wherein the access is granted to a computing device of a third party.

FIG. 2 illustrates an exemplary method 200 for granting access to data of a user in accordance with aspects of the present disclosure. The access is granted to a computing device of a third party. In one aspect, the method 200 for granting access to the data of the user starts in step 205 and proceeds to step 210.

In step 210, by the blocker 110, method 200 blocks the processing of the data of the user at the user's devices for a collected data processor 102.

In one aspect, the blocking of the processing of the data of the user comprises: blocking a predetermined list of processing methods for usage by any collected data processor.

In one aspect, the blocking of the processing includes the blocking of at least one of:
mobile and web tracking, for example, by:
  tracing and removing trackers from devices, and/or
  using a VPN service enabling trackers and advertisements to be cut out of the network traffic;
collecting geolocation information, for example, by:
  using virtual operators,
  spoofing geolocation, and/or
  switching off GPS, Wi-Fi and Bluetooth modules when they are not being used by the user;
collecting search queries, for example, by:
  using private search systems (for example, DuckDuckGo),
  proxying outgoing search queries,
  spoofing the identifiers of search systems in outgoing traffic, and/or
  removing the identifiers of search systems in outgoing traffic;
collecting registration data, for example, by means of:
  anonymous telephone numbers and mailboxes, and/or
  anonymous one-time maps.

In step 220, by the data collector 120, method 200 collects the data of the user and transfers the collected data to a storage device 150. In one aspect, the collected data comprises data that is blocked from being processed by an external collected data processor 102. The blocking of the data from being processed by the external collected data processor 102 is performed in accordance with current policies specified by a data access rights manager 130. In one aspect, the data collector 120 collects and transfers data to the storage device 150 using a data model and structure described above.

In one aspect, the data collector 120 transfers the data to the storage device 150 through a route modifier 140 and/or an anonymizer 160.

In one aspect, access to these data, by collected data processor 102, may only be received from the storage device 150. For example, the collected data processor 102, may not be on the list of permitted devices. For instance, the data may not be necessary for carrying out basic functions of the collected data processor 102.

In step 230, the system 100 receives a request for processing the data of the user on the user device 101. This request may be received by various means of the system 100, depending on the method for its implementation. For example, if there is an attempt to process the user's data on the device, this is detected by the blocker 110 (implicit request). For an explicit request, permission for processing this request will be received by the data access rights manager 130.

In one aspect, when the data processing request is received by the blocker 110, the request is redirected to the data access rights manager 130.

In one aspect, when device 101 is known to the system 100 (if rights have already been allocated to device 101), the method proceeds to step 240. In step 240, the request is redirected to the storage device 150 in which the data of the user is stored.

In another aspect, when the collected data processor 102 is not known to the system, the access rights are determined for the collected data processor 102. Then, the method proceeds to step 240.

In step 240, method 200 permits the collected data processor 102 to process the user's data without redirecting the request to the storage device 150.

In one aspect, method 200 permits the collected data processor 102 to process the user's data without redirecting the request when at least one of the following conditions is met: the collected data processor 102 is on the list of trusted devices; access to the data takes place in a context of a basic functionality accepted by the user; or similar scenario mentioned above.

In step 250, the storage device 150 determines the data access rights of the collected data processor to the user's data, and for which purpose the storage device 150 may use the stored copy of the data access rights for the collected data processor 102. In one aspect, the storage device 150 stores the copy of the data access rights which were previously determined by the data access rights manager 130 for use during this step. In another aspect, the storage device 150 contacts the data access rights manager 130 directly when the information is needed, through the agent 130a, for example. Thus, the storage device 150 may not be relying on a previously stored copy. After the determination of the data access rights, the method proceeds to step 260.

In step 260 access to the user's data is granted to the collected data processor in accordance with the determined rights. In a particular case, access is granted through the anonymizer, which executes the reverse conversion of the user's data located in the storage device 150. Information about this is recorded by the data tracker 180, the recording in a particular case being based on blockchain technology, and the technology for providing data for processing from the user to the collected data processor 102 may be implemented as a smart contract, in which the incoming offer from the owner of the collected data processor in a particular case is the cashless use of an application/program functionality (user's data in exchange for the functionality). In this example, after access to the processing of the user's data has been received, the user who has granted access to his data may use the functionality of a certain application or service, or he will be able to access any other product or service, optionally encrypted (for example, an insurance discount in the case of providing remote metering from a car).

Figure 2A:
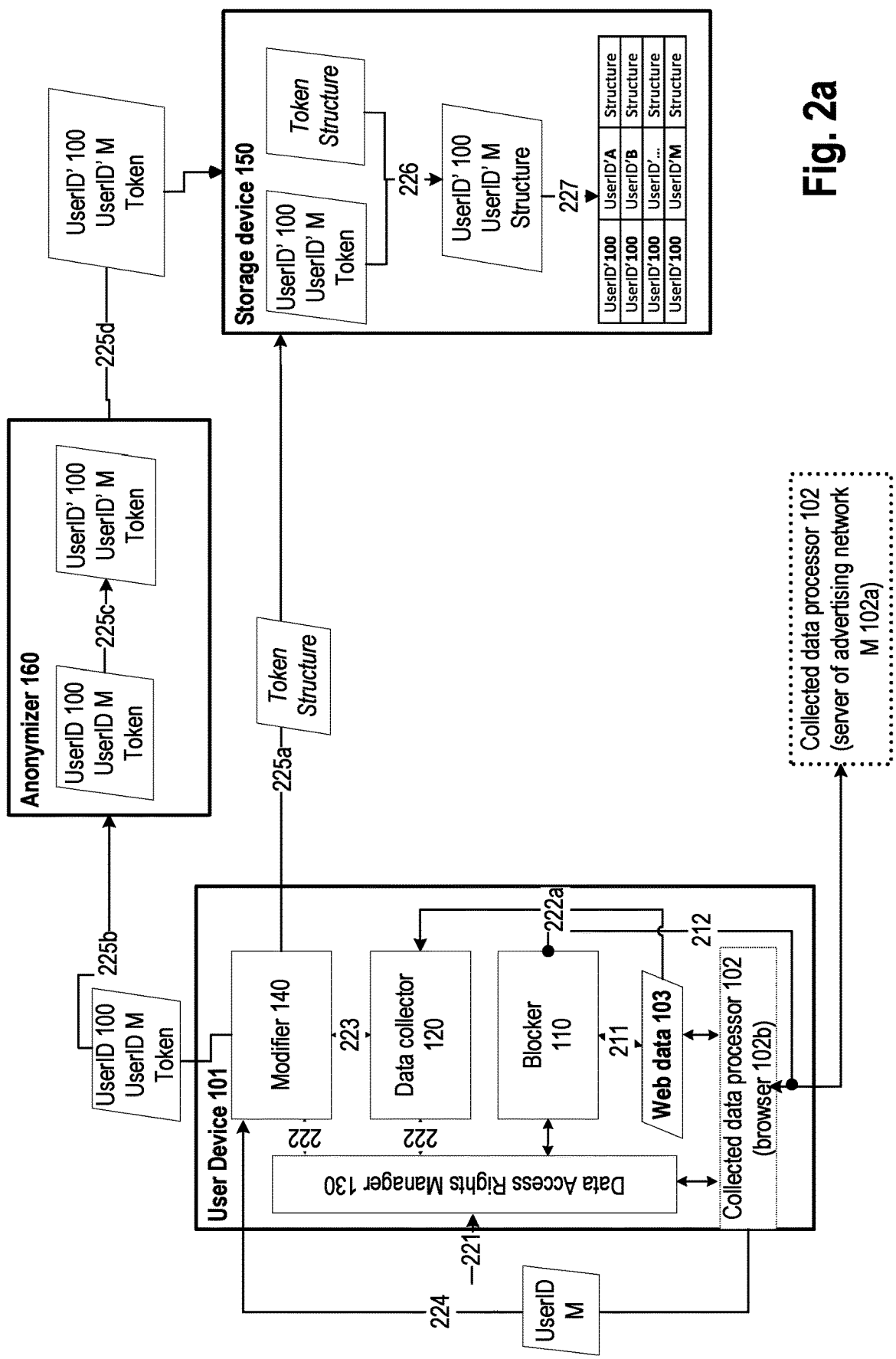
FIG. 2a illustrates an exemplary method for providing a user's data structure to collected data processor in the transmission of a data structure to a remote storage device from the user's device in accordance with aspects of the present disclosure.

FIG. 2a shows an exemplary method for providing user's data to a collected data processor 102. The blocker 110 blocks the processing of data for an advertising network M. In one aspect, the blocking comprises at least one of: removing from web data 103, including data created by a browser 102b and cookie files containing an advertising identifier, as shown in step 211; and spoofing the user's identifier in the advertising network M in network traffic, as shown in step 212. This impedes the operation of the collected data processor 102, which in the present case is used for user profiling (i.e., the collected data processor 102 is a profiling means). Thus, the advertising network will not be able to carry out targeting since it does not have the user profile. In turn, the reduction in the targeting results in a marked reduction in conversion (the number of clicks on an advertising announcement). Since the operating model of the advertising network is cost per click (CPC), there is a corresponding decline in average revenue per user (ARPU). Similar blocking is may be used by the user, since the user wishes to avoid the appearance of advertising for certain categories X of goods in his browser (for example, medicines, medical clinics and other items in the "health" category). However, the user may be prepared to receive targeted advertising for other categories of goods and services from said advertising network M. Thus, after the specified settings, in step 221, the data access rights manager 130 creates (establishes) access rights for the network M, wherein the access is for granting access to a history of search queries and clickstream, while excluding all search queries and clicks related to category X. The relevant information is sent to the various components of system 100, in step 222; in particular, the data collector 120 receives the data structure with fields for completion, the modifier 140 receives categories of data whose transmission is prohibited, and the storage device 150 receives the access rights for the advertising network M. In particular cases, various scenarios are then possible, for example:

- the data collector 120 collects all the search queries and clicks from the user's devices 101, all the data are sent to the storage device 150, and the storage device 150 independently creates (or in a particular case completes) the structure for processing by the collected data processor 102 of the advertising network M in accordance with the access rights, having excluded the clicks and search queries from category X;
- the data collector 120 collects all the search queries and clicks from the user's devices 102, all the data are sent to the modifier 140, and the modifier 140 removes substructures relating to category X and moves the modified structure to the storage device 150, and in this form it will be transferred to the collected data processor 102 of the advertising network M;
- the data collector 120 collects the search queries and clicks not relating to category X and moves the structure to the storage device 150, and in this form it will be transferred to the collected data processor 102 of the advertising network M;
- the data collector 120 collects the search queries from all categories and the clicks not relating to category X, and the structure is transferred to the modifier 140, the modifier 140 removes search queries relating to category X from the received structure and transfers the modified structure to the storage device 150, and in this form it will be transferred to the collected data processor 102 of the advertising network M (the example in FIG. 2a, which will be examined subsequently, relates to this scenario).

As a general rule, such scenarios apply not only to clicks and search queries, but also to other types of user's data, where this is possible, the collected data processor 102 do not only relate to advertising networks, and the user may have more than one device. In a particular case, when the storage device 150 is located in a remote unit, as in FIG. 2a, the modified structure from the modifier is not sent directly to the storage device 150.

Figure 2B:
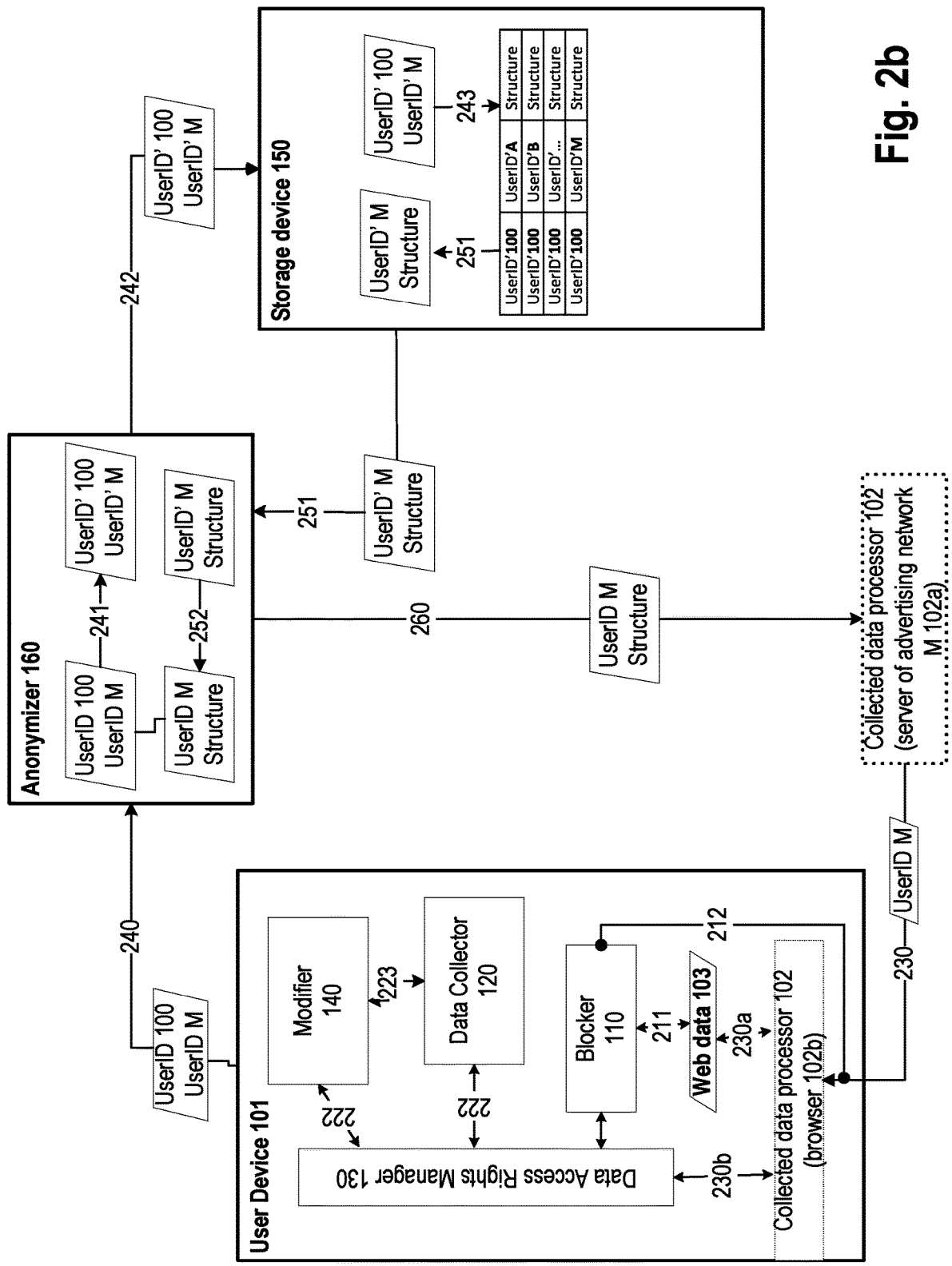
FIG. 2b illustrates an exemplary method for providing a user's data structure to collected data processor in the transmission of a data structure from storage device to a collected data processor in accordance with aspects of the present disclosure.

An example according to the last scenario is examined further below. After the rights for the collected data processor 102 of network M have been drawn up by the means 130 in step 221, the data access rights manager 130 transfers the format of the structure to the data collector 120 for the completion of the fields in step 222. The structure comprises at least a "search queries" field and a "clickstream" field, and in turn the clickstream field comprises a field of categories of web resources in which a field for category X is absent. In step 222a, the data collector 120 completes the fields. The data for the completion in a particular case are selected from the retained web data 103 accumulated in the course of the user's network activity. These data are formulated both by the browser 102*a* and by additional components of the system 100, such as plug-ins in the browser or UI interceptors (these are not shown in FIG. 2*a,* and in a particular case are modules of the data collector 120). In step 223, the data collector 120 transfers the completed structure to the modifier 140, which in turn, on the basis of the structure format received also in step 222 from the data access rights manager 130, analyzes the fields of the search queries for the presence of queries relating to category X, after which the query data are removed. In step 224, the modifier 140 receives from the collected data processor 102 the user identifier in the advertising network M (UserIDM) (from the cookie file or from a profile in the browser, for example) and the user identifier in the system 100 (UserID100) from the data access rights manager 130 (not shown in FIG. 2*a*). The structure with the user's data is then encrypted with a public key, and a pair of identical random tokens is generated, one of the tokens being linked to the identifiers while the second token is linked to the user's data structure (for example, it is added in an additional field to the structure, this step not being shown in FIG. 2*a*). In step 225*a,* the user's data structure is then sent to the storage device 150, and the identifiers with the second token are sent to the anonymizer 160 in step 225*b*. The anonymizer 160 converts the identifiers in step 225*c,* and the converted identifiers UserID'100 and UserID'M are transferred in step 225Г to the storage device 150. In the storage device 150, the identifiers are linked with the user's data structure on the basis of identical tokens in step 226. The storage device 150 links the received data structure with other data structures for this user in step 227. The conversion means 160 changes the original user identifier in the system 100 and the identifier for the advertising network M, in order to protect the user's data in case of a data leak from the storage device 150, since the data owner cannot be recognized with the changed identifiers. The data requests from the advertising network M for the processing of the data are redirected to the storage device 150 through the anonymizer 160, as shown in FIG. 2*b*. As can be seen in FIG. 2*b*, the request can be directed by the server through the client in step 230, or by the client itself in accordance with its functionality in step 230*a* and/or in step 230*b*. In a particular case, the request comprises a user identifier in the advertising network Mm, UserIDM. In step 240, the request is redirected to the anonymizer 160. When the request is redirected, the user identifier in the system 100 is attached to the request, and, in a particular case, information about the requested data, for example the enumeration of the fields of the structure is added; there may be various formats such as XML, JSON, etc. In step 241, the anonymizer 160 converts the user identifier in the system 100 and the identifier in the advertising network M, and it transfers the converted identifiers to the storage device in step 242. The storage device 150 detects, in step 243 the data linked to the user, on the basis of UserID'100, and determines the rights for the advertising network M in step 250 (not shown in FIG. 2*b*), and the storage device 150 prepares the data for processing by the collected data processor 102 in accordance with the access rights. In the present example, this takes place by means of the detection of UserID'M and the data structure related thereto. When the data are detected, they are returned, together with the UserID'M, to the anonymizer 160 in step 251, the anonymizer 160 returns the original value to the user identifier in the network M in step 252, and the user's data, together with the original UserIDM, is transferred to the collected data processor 102 of the advertising network, while the occurrence of the transmission is recorded by the data tracker 180.

In a particular case, the advertising network may contact the anonymizer directly without the redirection of requests by the device 101, while in the present case the collected data processor itself redirects the request: instead of the device it contacts the storage device, in a particular case through the anonymizer 160. In another particular case, the data are not transferred to the collected data processor 102, but access to a copy of the data placed in the storage device 150 is granted.

In one aspect, the present disclosure also describes a method 300 for updating the user's data. The system shown in FIG. 1 is also used for implementing the method 300. This method is implemented when not all the data for processing are placed in the storage device and/or when the user has more than one device from which data may be received. In method 300, steps 210, 230, 240 and 250 are similar to the steps of the method shown in FIG. 2.

In step 310, by the storage device 150, method 300 detects that the data for which the collected data processor have received access rights are not located in the storage device.

In step 320, method 300 transfers information about the absent data to the storage device 150. In a particular case, when the absence of the data is detected, the storage device 150 contacts the data access rights manager 130. The data access rights manager 130 updates the data model, in accordance with which the data collector 120 completes new fields in the structure (in our example, those relating to the location). The data access rights manager 130 then sends the data to the storage device 150. In a particular case, the data are sent with the use of the modifier 140 (the modifier 140 carries out an analysis of the data for criticality and other conformity with the rights established by the data access rights manager 130) and the anonymizer 160, if the detected data require further conversion.

Figure 3:
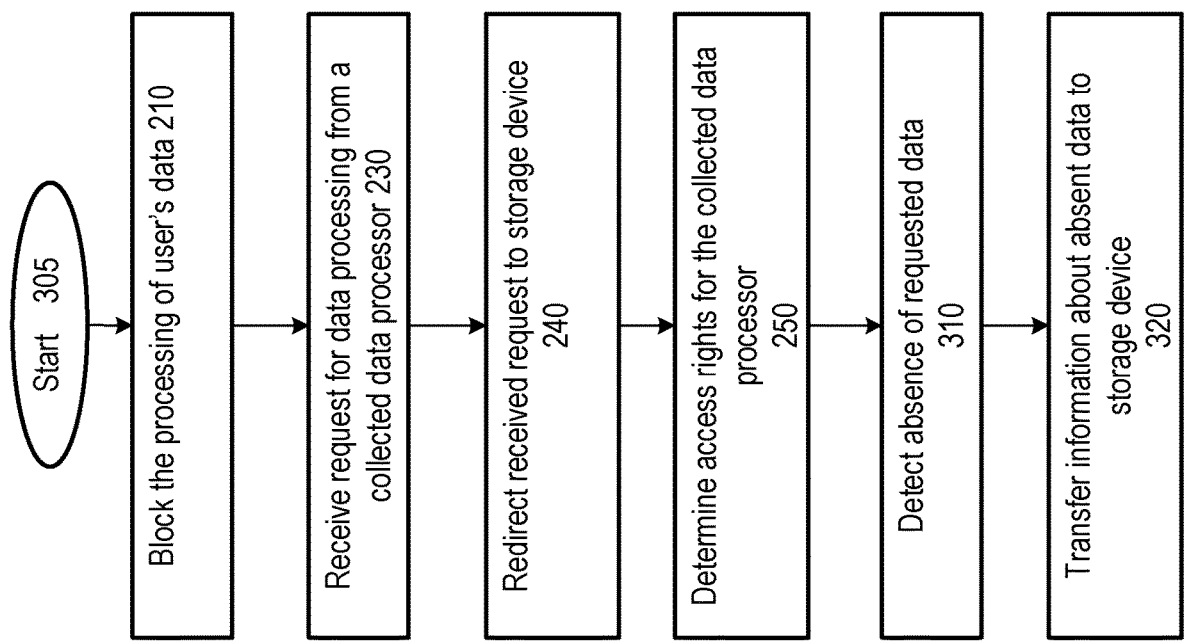
FIG. 3 illustrates an exemplary method for updating a user's data in a storage device in accordance with aspects of the present disclosure.
Figure 3A:
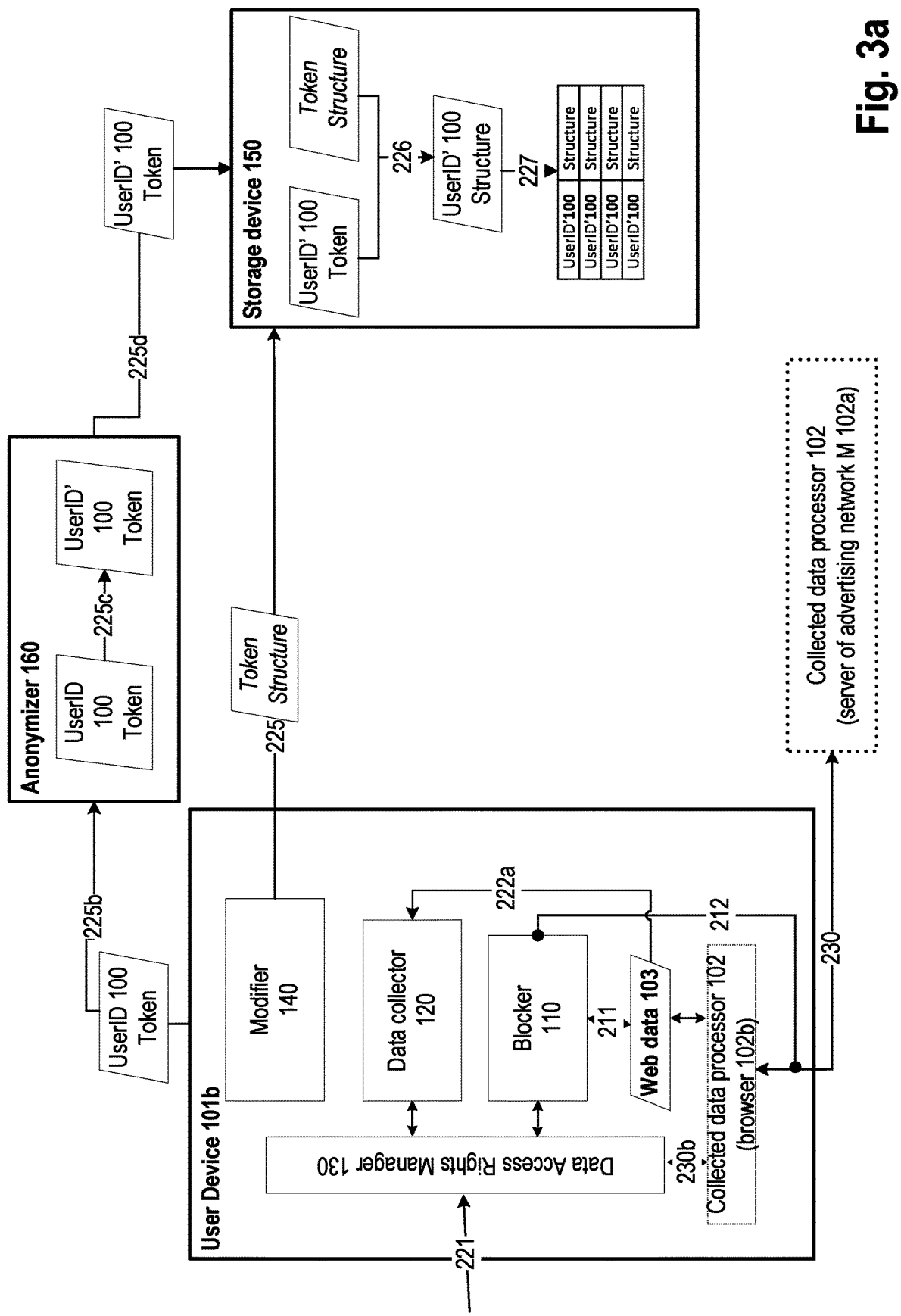
FIG. 3a illustrates an exemplary method for updating a user's data in the transmission of a data structure to a remote storage device in accordance with aspects of the present disclosure.

FIG. 3*a* an exemplary implementation of the method 300 for updating the user's data. The example with the advertising network M will be examined further. In the present case, however, the system 100 operates according to the following scenario:

- web tracking is blocked in advance (steps 211, 212) in the device 101*b* (a PC, in our example),
- the data collector 120 collect all the user's search queries and clicks in step 222*a* (as the most widespread data for processing),
- the collected data is sent to the storage device 150 (steps 225*a*-227), and the storage device 150 then independently creates the structure for processing by the collected data processor in accordance with their access rights.

In addition to information on search queries and clicks, the advertising network M in the present example has requested information on the location: in step 230, the server 102*a* sent a request to the client 102*b,* which sent it to the data access rights manager 130 in step 230*b*. The user issued this permission in step 221, and the data access rights manager 130 drew up rights, including rights to location data.

Figure 3B:
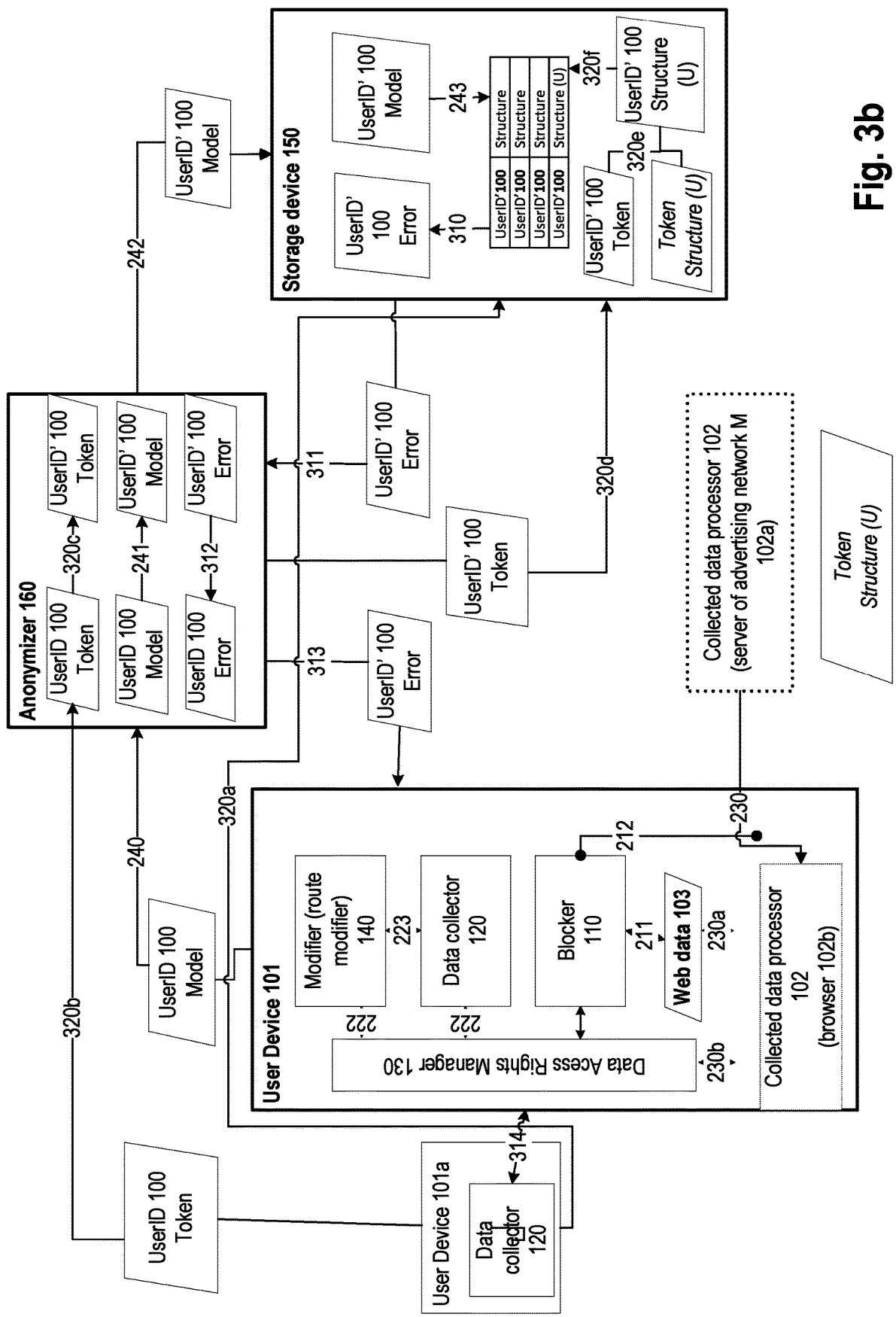
FIG. 3b illustrates an exemplary method for updating a user's data in the transmission of an updated data structure to a storage device in accordance with aspects of the present disclosure.

Since the storage device 150 independently creates or completes data structures for processing by the collected data processor 102, in step 240 (here and hereafter, see FIG. 3*b*), when the request is redirected, through the user identifier UserID100, information about the data to which rights have been drawn up for the advertising network M is added to the request, in the form of fields of the data structure for example (in FIG. 3*b,* this is denoted "Model"). In step 242, the storage device 150 receive the converted user identifier UserID'100 and the fields of the data structure from the anonymizer 160. In step 243, it finds the user's data located in the store. The storage device 150 then determines the access rights to the data, for which, in our example, the means 150 compares the fields of the structure (taken from the "Model") attached to the request with the data located in the storage device, and in step 310 detects (not shown in FIG. 3b) that the information about the user's location UserID'100 has not been placed on the means 150 (as a result, a completion error, for example, appears). The storage device 150 contacts the data access rights manager 130 with a request for data shown in the structure but absent from the means 150. The data access rights manager 130 is contacted, for example, through an agent 130a, which in step 311 will contact the anonymizer 160 and convert the identifier UserID'100 in the request to the original UserID100 with the aid of the anonymizer 160 in step 312, and will transfer the request to the data access rights manager 130 in step 313. According to the results of the request from the storage device 150, the data access rights manager 130 updates the information about the data to be collected, where the updating includes at least two steps:

detecting, among the user's devices, the devices that may provide the requested data (in the example examined here, it is a mobile telephone 101a);

updating the fields of the structures (in our example, adding the "location" field) for the data collector 120, particularly in the devices where fields containing the requested data are added; in the example under examination, this is in step 314.

In step 320, the storage device then receives the requested data. In the example under examination, step 320 from FIG. 3 consists of a number of sub-steps (320a-320f) in FIG. 3b.

In step 320a, the updated user's data structure with information including the location is sent to the storage device 150, and the user identifier in the system 100 with the second token is sent to the anonymizer 160 in step 320b. The anonymizer 160 converts the identifier in step 320c, and the converted identifier UserID'100 is transferred in step 320d to the storage device 150. In the storage device 150, the identifier is linked with the updated user's data structure on the basis of identical tokens in step 320e. The storage device 150 then links the received data structure to other data structures for this user in step 320f. The storage device can then complete the necessary fields at the request of the collected data processor 102.

An example of the implementation of the method 200 for providing user's data to collected data processor will now be examined on the basis of FIGS. 2a-2b. The blocker 110 blocks the processing of data for an advertising network M; more specifically, it blocks the collection of URL addresses/resources that the user visits (clickstream) and the history of search queries. The blocking is carried out by:

in step 211, removing from the web data 103, including data created by a browser 102b, cookie files containing a temporary user identifier in the advertising network M installed by scripts on web pages;

in step 212, in the network traffic, spoofing the permanent user identifier in the advertising network M, which is identical to the log-in of the account with which the user has entered the browser;

spoofing the identifier of the browser installation 102b in the network traffic.

Figure 4:
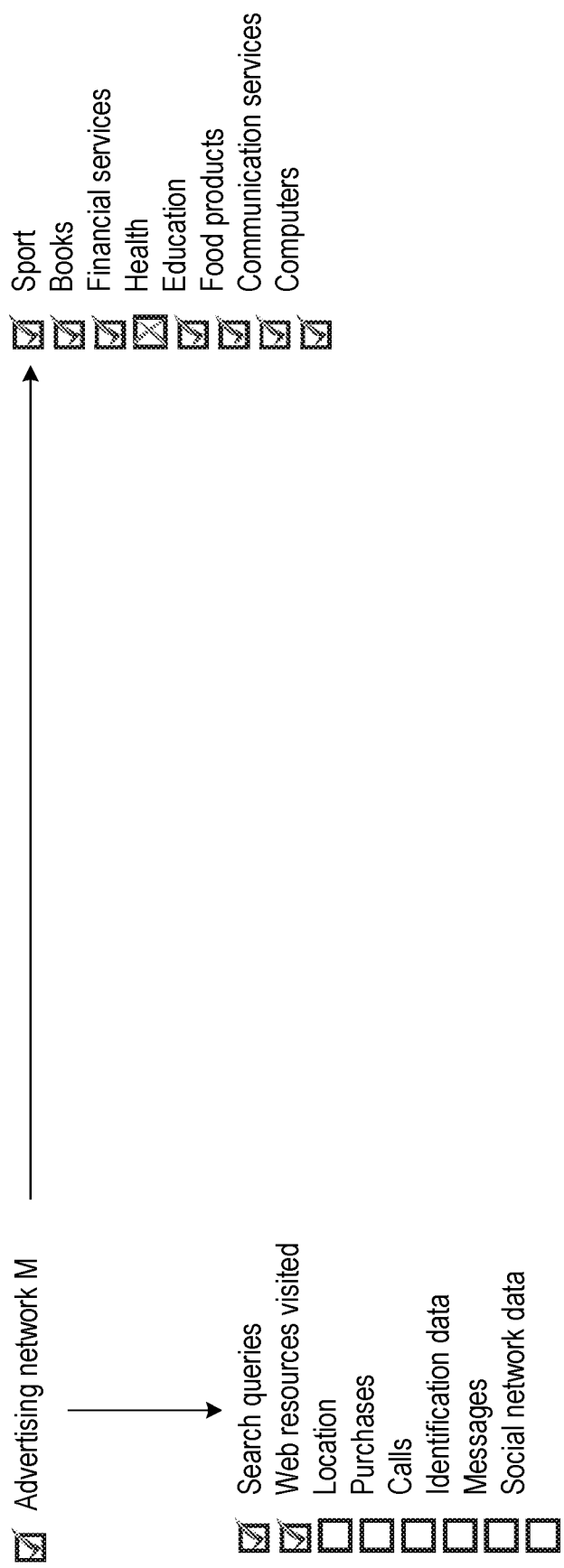
FIG. 4 illustrates an example for setting data permissions in accordance with aspects of the present disclosure.

On the basis of the clickstream and search queries, the advertising network M carries out profiling, followed by targeting of advertising messages. Thus the advertising network will not be able to carry out targeting since it does not have the user profile, resulting in a marked reduction in conversion (the number of clicks on an advertising announcement), and since the operating model of the advertising network is cost per click (CPC), there is a corresponding decline in average revenue per user (ARPU) (. Similar blocking is used by the user, since the user wishes to avoid the appearance of advertising of goods in the "health" category in his browser (for example, medicines, medical clinics and other items from the "health" category). However, the user is prepared to receive targeted advertising for other categories of goods and services from said advertising network M ("Sport", "Education", "Books", . . . , "N"). The user is prepared to share only the history of search queries and the web resources visited for profiling. The setting data are specified, in step 221, and an example of such settings is shown in FIG. 4. The system 100 also blocks any advertising announcements not wanted by the user, by the blocker 110. In step 212, it will remove advertising data with unwanted content from the traffic, and block the loading of advertising data with unwanted content, namely advertising data relating to the "health" category is blocked from being loaded and removed.

Thus, after the specified settings, in step 221, the data access rights manager 130 creates access rights for the advertising network M to the whole history of search queries and the clickstream, excluding search queries and clicks relating to the "health" category. The information relating to this is sent out to the various components of the system 100 in step 222.

In step 222, the data collector 120 receives the data structure with fields for completion, and the structure comprises the following fields:

search queries;

web resources visited, e.g., art, entertainment, business, games, general, job seeking, etc.

In step 222, the data collector 120 is ordered to collect all the search queries and all the web resources visited that cannot be assigned to the health category. Profiling for targeting advertising materials in the "health" category may be used by various categories of web resources, and therefore the data access rights manager 130, when creating a structure for the data collector 120, reduces the general category of "health" to more partial categories (subcategories) of web resources, and does not include them in the fields of the structure for the data collector 120, for example, such subcategories of web resources as medicines, medical services, medical information portals and the like. For example, the structure may look like this:

```
StructureForM = {"Search queries": [ ],
    "URL-resources": {
        "Sport": [ ],
        "Art": [ ],
        "News": [ ],
        "Cars": [ ],
        "Games": [ ],
        ...
    }
}
```

In step 222, the modifier 140 receives the categories of search queries whose transmission is prohibited. The modifier 140 uses a natural language processing technology to analyze and classify the search queries. In step 222, the storage device 150 also receives the access rights for the advertising network M.

Then, in step 222a, the data collector 120 collects the search queries from all categories and the web resources visited that do not relate to the "health" category, and completes the fields of the structure. The data for the completion of the structure are selected by the data collector 120 from the retained web data 103 accumulated in the course of the user's network activity. These data are created both by the browser 102*a* and by additional means of the system 100, such as plug-ins in the browser or UI interceptors (these are not shown in FIG. 2*a*, and are modules of the data collector 120).

```
StructureForM = {"Search queries": [R1, R2, R3,..., Rn],
"URL-resources": {
    "Sport": [URL1, URL2, URL3,..., URLn],
    "Art": [URL1, URL2, URL3,..., URLn],
    "News": [URL1, URL2, URL3,..., URLn],
    "Cars": [URL1, URL2, URL3,..., URLn],
    "Games": [URL1, URL2, URL3,..., URLn],
    ...
    }
}.
```

In step 223, the completed structure is transferred to the modifier 140. On the basis of the information about the prohibited categories received in step 222 from the data access rights manager 130, the modifier 140 analyzes the fields of the search queries for the presence of queries relating to the "health" category. The search queries relating to the "health" category (in the present example, this is query R3) are then removed from the received structure.

In step 224, the modifier 140 receives from the collected data processor 102 the user identifier in the advertising network M (UserIDM) from the cookie file or from a profile in the browser, and the user identifier in the system 100 (UserID100) from the data access rights manager 130 (not shown in FIG. 2*a*). The structure with the user's data, comprising the search queries and URL-resources, is encrypted with a public key (Rn→Rn', URLn→URLn'). The modifier 140 generates a pair of identical random tokens. One of the tokens is linked to the identifiers UserIDM and UserID100:

User={"ID": [UserIDM, UserID100], "Token": token}.

The second token is linked to the user's data structure (it is added in an additional field to the structure) as follows:

```
StructureForM = ("Search queries": [R1', R2',..., Rn'],
    "URL-resources": {
        "Sport": [URL1', URL2', URL3',..., URLn'],
        "Art": [URL1', URL2', URL3',..., URLn'],
        "News": [URL1', URL2', URL3',..., URLn'],
        "Cars": [URL1', URL2', URL3',..., URLn'],
        "Games": [URL1', URL2', URL3',..., URLn'],
        ...
        }
    "Token": token
}.
```

In step 225*a*, the user's data structure is then sent to the storage device 150, and the identifiers with the second token are sent to the anonymizer 160 in step 225*b*.

The anonymizer 160 converts the identifiers in step 225*c*. The anonymizer 160 changes the original user identifier in the system 100 and the identifier for the advertising network M, in order to protect the user's data in case of a data leak from the storage device 150, since the data owner cannot be recognized with the changed identifiers:

User={"ID": [UserIDM, UserID100], "Token": token}→

User={"ID": [UserID'M, UserID'100], "Token": token}→

The converted identifiers UserID'100 and UserID'M are transferred in step 225*d* to the storage device 150. In the storage device 150, the identifiers are linked with the user's data structure on the basis of identical tokens in step 226. The storage device 150 links the received data structure with other data structures for this user in step 227:

```
DataForUserID'100 = {    "UserID'M": StructureForM,
                         "UserID'K": StructureForK,
                         ...
}.
```

The data requests from the advertising network M for the processing of the data are then redirected to the storage device 150 through the anonymizer 160, as shown in FIG. 2*b*. As can be seen in FIG. 2*b*, the request is sent by the server 102*a* through the browser 102*b* in step 230. The request comprises a user identifier in the advertising network M, UserIDM. In step 240, the request is redirected to the anonymizer 160. When the request is redirected, the user identifier in the system 100 is attached to the request:

User={"ID": [UserIDM, UserID100]}.

In step 241, the anonymizer 160 converts the user identifier in the system 100 and the identifier in the advertising network M:

User={"ID": [UserID'M, UserID'100],}.

In step 242, it transfers the converted identifiers to the storage device 150. The storage device 150 detects, in step 243, the data linked to the user, on the basis of UserID'100, and determines the rights for the advertising network M in step 250; in the present example, this takes place by means of a search for UserID'M and its associated data structure. When the data are detected, they are returned, together with UserID'M, to the anonymizer 160 in step 251, the anonymizer 160 returns the original value to the user identifier in the network M in step 252, and the user's data, together with the original UserIDM, is transferred to the collected data processor 102 of the advertising network, while the occurrence of the transmission is recorded by the data tracker 180.

In a particular case, the advertising network may contact the anonymizer directly without the redirection of requests by the device 101, while in the present case the collected data processor itself redirects the request: instead of the device it contacts the storage device, in a particular case through the anonymizer. In another particular case, the data are not transferred to the collected data processor 102, but access to a copy of the data placed in the storage device 150 is granted.

As noted above, the system shown in FIG. 1 is also used for implementing the method of updating the user's data 300. Thus, methods 200 and 300 are implemented using the system of FIG. 1. This method is implemented when not all the data for processing are placed in the storage device and/or when the user has more than one device from which data may be received. For example, for method 300, in step 310, the storage device 150 detects that the data for which the collected data processor 102 has received access rights are not located in the storage device 150. In step 320, therefore, the missing user's data are transferred from the device to the storage device 150. In a particular case, when the absence of the data is detected, the storage device 150 contacts the data access rights manager 130. The data access rights manager 130 updates the data model, in accordance with which the data collector 120 completes new fields in the structure (in our example, those relating to the location). The data access rights manager 130 then sends the data to the storage device 150. In a particular case, the data are sent with the use of the modifier 140 (the modifier 140 carries out an analysis of the data for criticality and other conformity with the rights established by the data access rights manager 130) and the anonymizer 160, if the detected data require further conversion.

FIG. 5 is a block diagram illustrating a computer system 20 on which aspects of systems and methods for granting access to data of a user and for updating the data of a user may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for granting access to data of a user, the method comprising:
   blocking the processing of data of a user;
   transferring the data of the user to a storage device;
   receiving a request for data processing from a collected data processor of a device;
   redirecting the received request to the storage device;
   managing, by the storage device, data access rights for the collected data processor of the device from which the request for data processing is received in accordance with data access rights established by a data access rights manager, wherein the management of the data access rights comprises formulating rights of the collected data processors to access data, withdrawing data access rights from the collected data processors, and creating lists of collected data processors that are permitted to access the data; and
   providing access to the data in accordance with the data access rights.

2. The method of claim 1, further comprising:
   detecting an absence of the requested data; and
   transferring information about the absent data to the storage device.

3. The method of claim 1, wherein the transferring of the data of the user to the storage device is performed through at least one of a route modifier and an anonymizer,
   wherein the route modifier analyzes the data in fields of data structure received from a data collector, divide the data structure into substructures in order to determine the state of the data, and select the route for sending data to the storage device for the resulting substructure, and
   wherein the anonymizer anonymizes user identifiers.

4. The method of claim 1, wherein the request is processed without redirecting to the storage device when the collected data processor is on the list of trusted devices or when the request is related to a basic functionality accepted by a user device.

5. The method of claim 1, wherein the blocking of the processing includes blocking at least one of:
   mobile and web tracking;
   collecting geolocation information;
   collecting search queries; and
   collecting registration data.

6. The method of claim 1, wherein the blocking of the processing of the data blocks the processing by the collected data processor of an external device.

7. The method of claim 1, wherein the request for data processing is received from the collected data processor implicitly by a blocker or directly by the data access rights manager, and wherein when the request is received by the blocker, the request is forwarded to the data access rights manager.

8. A system for granting access to data of a user, comprising:
at least one hardware processor configured to:
blocking the processing of data of a user;
transfer the data of the user to a storage device;
receive a request for data processing from a collected data processor of a device;
redirect the received request to the storage device;
manage, by the storage device, data access rights for the collected data processor of the device from which the request for data processing is received in accordance with data access rights established by a data access rights manager, wherein the management of the data access rights comprises formulating rights of the collected data processors to access data, withdrawing data access rights from the collected data processors, and creating lists of collected data processors that are permitted to access the data; and
provide access to the data in accordance with the data access rights.

9. The system of claim 8, wherein the hardware processor is further configured to:
detect an absence of the requested data; and
transfer information about the absent data to the storage device.

10. The system of claim 8, wherein the transferring of the data of the user to the storage device is performed through at least one of a route modifier and an anonymizer,
wherein the route modifier analyzes the data in fields of data structure received from a data collector, divide the data structure into substructures in order to determine the state of the data, and select the route for sending data to the storage device for the resulting substructure, and
wherein the anonymizer anonymizes user identifiers.

11. The system of claim 8, wherein the request is processed without redirecting to the storage device when the collected data processor is on the list of trusted devices or when the request is related to a basic functionality accepted by a user device.

12. The system of claim 8, wherein the blocking of the processing includes blocking at least one of:
mobile and web tracking;
collecting geolocation information;
collecting search queries; and
collecting registration data.

13. The system of claim 8, wherein the blocking of the processing of the data blocks the processing by the collected data processor of an external device.

14. The system of claim 8, wherein the request for data processing is received from the collected data processor implicitly by a blocker or directly by the data access rights manager, and wherein when the request is received by the blocker, the request is forwarded to the data access rights manager.

15. A non-transitory computer readable medium storing thereon computer executable instructions for granting access to data of a user, including instructions for:
blocking the processing of data of a user;
transferring the data of the user to a storage device;
receiving a request for data processing from a collected data processor of a device;
redirecting the received request to the storage device;
managing, by the storage device, data access rights for the collected data processor of the device from which the request for data processing is received in accordance with data access rights established by a data access rights manager, wherein the management of the data access rights comprises formulating rights of the collected data processors to access data, withdrawing data access rights from the collected data processors, and creating lists of collected data processors that are permitted to access the data; and
providing access to the data in accordance with the data access rights.

16. The non-transitory computer readable medium of claim 15, the instructions further comprising instructions for:
detecting an absence of the requested data; and
transferring information about the absent data to the storage device.

17. The non-transitory computer readable medium of claim 15, wherein the transferring of the data of the user to the storage device is performed through at least one of a route modifier and an anonymizer,
wherein the route modifier analyzes the data in fields of data structure received from a data collector, divide the data structure into substructures in order to determine the state of the data, and select the route for sending data to the storage device for the resulting substructure, and
wherein the anonymizer anonymizes user identifiers.

18. The non-transitory computer readable medium of claim 15, wherein the request is processed without redirecting to the storage device when the collected data processor is on the list of trusted devices or when the request is related to a basic functionality accepted by a user device.

19. The non-transitory computer readable medium of claim 15, wherein the blocking of the processing includes blocking at least one of: mobile and web tracking;
collecting geolocation information;
collecting search queries; and
collecting registration data.

20. The non-transitory computer readable medium of claim 15, wherein the blocking of the processing of the data blocks the processing by the collected data processor of an external device.

21. The non-transitory computer readable medium of claim 15, wherein the request for data processing is received from the collected data processor implicitly by a blocker or directly by the data access rights manager, and wherein when the request is received by the blocker, the request is forwarded to the data access rights manager.

* * * * *